United States Patent [19]
Kirk et al.

[11] 4,119,375
[45] Oct. 10, 1978

[54] BEARING AND HOUSING ASSEMBLY

[75] Inventors: Robley Gordon Kirk; Hanns Hornschuch, both of Easton, Pa.

[73] Assignee: Ingersoll-Rand Company, Woodcliff Lake, N.J.

[21] Appl. No.: 829,812

[22] Filed: Sep. 1, 1977

[51] Int. Cl.² .......................................... F16C 23/00
[52] U.S. Cl. ........................................ 308/9; 308/26; 308/122; 308/DIG. 1
[58] Field of Search ................. 308/9, 5 R, 26, 28, 308/31–33, 27, 15, 3 R, 121, 73, 122, 160, DIG. 1, 184

[56] References Cited
U.S. PATENT DOCUMENTS

| | | | |
|---|---|---|---|
| 3,110,526 | 11/1963 | Sternlicht | 308/73 X |
| 3,427,656 | 2/1969 | Miller | 308/26 X |
| 3,804,475 | 4/1974 | Brücher et al. | 308/122 |
| 3,930,691 | 1/1976 | Greene | 308/73 X |
| 4,035,037 | 7/1977 | Cunningham | 308/5 R |

Primary Examiner—Trygve M. Blix
Assistant Examiner—Douglas C. Butler
Attorney, Agent, or Firm—Bernard J. Murphy

[57] ABSTRACT

In the embodiment shown, the assembly comprises a housing and a fluid-film journal bearing having pivoting elements arranged between the housing and the bearing to accommodate pivotal movement of the bearing within and spaced apart from the inner-housing surface. In addition, a damping plate is disposed between the bearing and the inner surface of the housing to prevent horizontal movement of the bearing within the housing and also to constrain vertical movement of the bearing. The pivot elements are engaged with flexure pads carried by the housing, the pads confining an elastomeric damper therewithin, and, in alternative embodiments, the flexure pads confine a visco-elastic substance, or oil, to control vibration.

8 Claims, 9 Drawing Figures

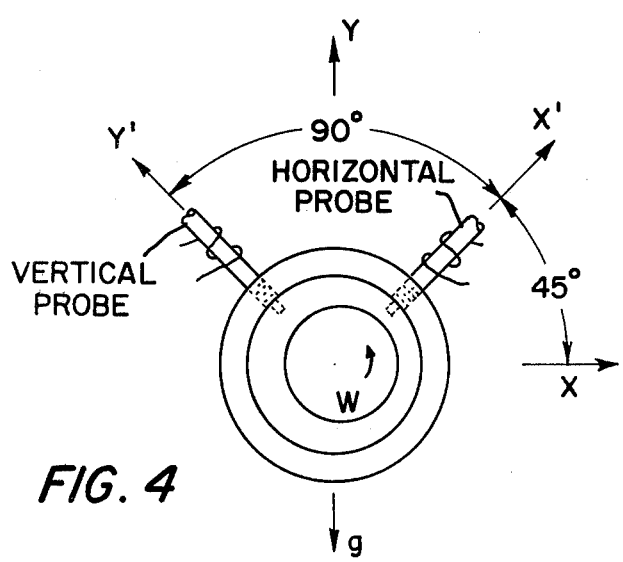

BEARING AND HOUSING ASSEMBLY

This invention pertains to bearing and housing assemblies, and in particular to a bearing and housing assembly which provides improved support characteristics for bearings, particularly for fluid-film bearings of the hydro-dynamic type.

In many rotary journal applications it is not possible to alter the bearing span, or the geometry of the journal, or the characteristics of the bearing to provide a resonant-free design in the bearing and its housing which is complementary to the desired or necessary speed range of the journal. As by way of example, in typical blast furnace blower applications, a given or designed speed range, because of bearing loading and asymmetry, will produce responses or bearing excitations which occur within the design speed range. Accordingly, it is necessary, if the aforesaid alterations can not be undertaken, either to provide a bearing housing assembly which will eliminate the bearing excitations (which would occur within the desired, operating speed ranges) or to anticipate premature bearing failure and expensive maintenance and repair.

It is an object of this invention to provide an improved bearing and housing assembly which does eliminate the bearing excitations from desired, operating speed ranges. It is particularly an object of this invention to provide a bearing and housing assembly comprising first means defining a housing for supporting a bearing; and second means, for interpositioning between said first means and a bearing supported thereby, for mounting such bearing pivotably on an axis perpendicular to such bearing.

Further objects of this invention as well as the novel features thereof will become more apparent by reference to the following description taken in conjunction with the accompanying Figures in which:

FIG. 4 is a diagram representative of the use of sensing probes as such could be employed to yield the foregoing, plotted parameters;

FIG. 5 is a plot or diagram of amplitude and speed of a typical hydro-dynamic fluid-film bearing employed, by way of example, on the shaft of a blower for a blast furnace, according to prior art bearing housing assembly and support practices;

FIG. 6 is a vertical cross-sectional illustration of an embodiment of the invention;

FIG. 7 is a plot of amplitude and speed diagrammatically projecting the design-speed response of a bearing supported in the bearing housing assembly of FIG. 6;

FIG. 8 is a partial cross-sectional view of an alternative embodiment of the invention; and FIG. 9 is an isometric illustration of one of the pivot elements.

Figure 1:
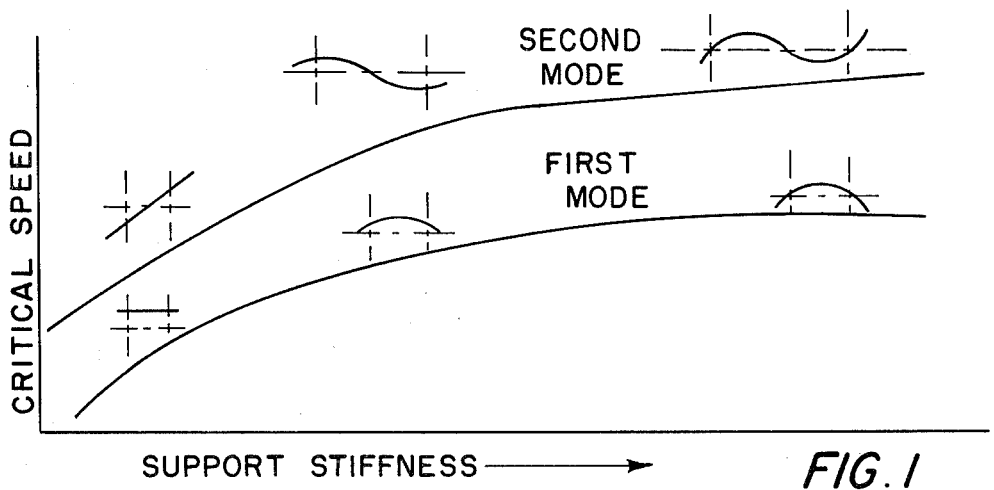
FIG. 1 is a plot or diagram of rotor system critical speeds relative to bearing support stiffness.

In accordance with typical terminology among rotating equipment manufacturers, natural modes of equipment vibration are identified as a first mode, second mode, third mode, etc., and to each is ascribed a given single speed at which these natural modes will be excited (by imbalance for example). This is totally correct and true for all systems having symmetric or near-symmetric bearing and support systems. The first mode (cylindrical) of vibration for a typical rotary machine, such as a compressor, or blower, or the like, has the response at each of two rotary-shaft-supporting bearings in phase. FIG. 1 shows the relative mode shapes to be expected as a function of bearing support stiffness. The second mode (conical) is one having the response at the bearings out of phase with a node or minimum response occurring in the shaft between the bearing support points.

Figure 2:
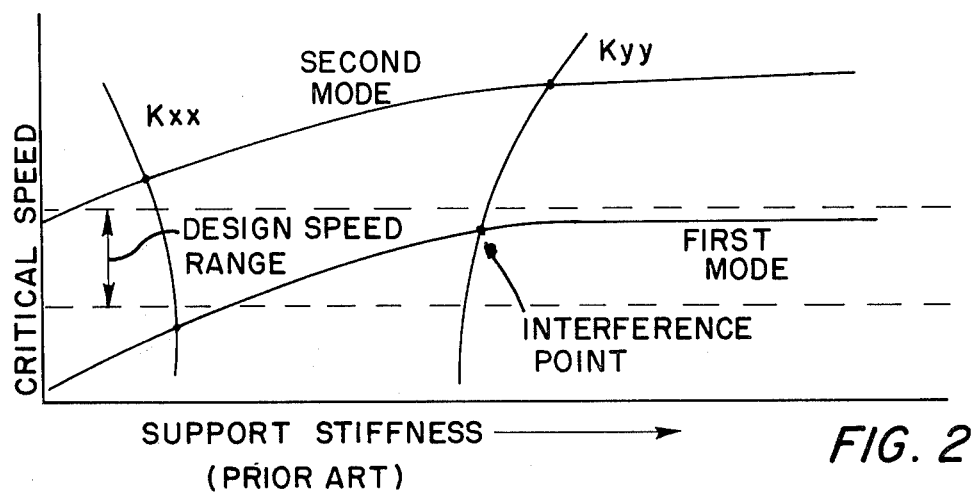
FIG. 2 is a plot or diagram, like that of FIG. 1, representative of bearing excitations as occur with known or prior art bearing support assemblies.
Figure 3:
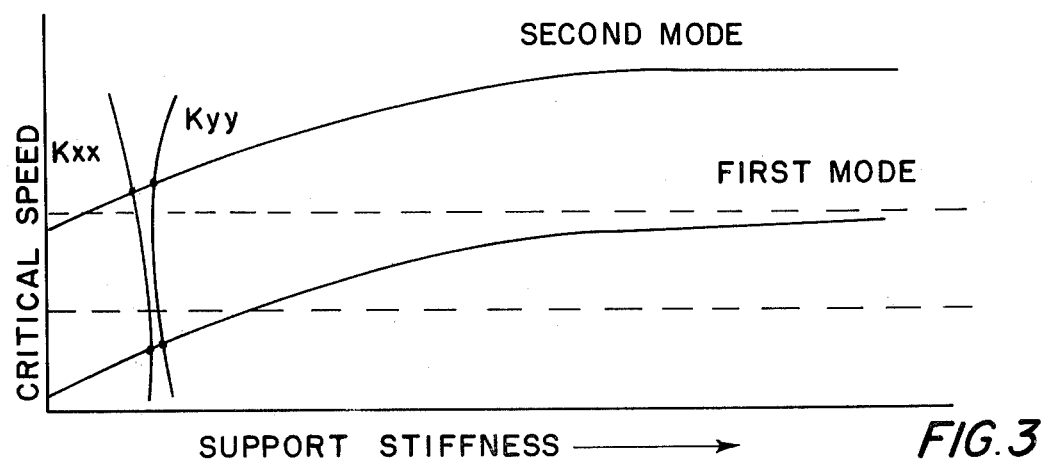
FIG. 3 is a further plot or diagram of bearing response arising from the support thereof in a housing defined by the invention.

Owing to the asymmetry associated with a heavily loaded machine shaft, the bearing stiffness in two orthogonal directions (vertical and horizontal for example) are different by such a magnitude to cause two distinct frequencies at which a cylindrical mode can be excited by rotating imbalance. FIGS. 2 and 3 present critical speed plots of a blower shaft without and with the novel bearing housing assembly, respectively. The response plots of FIGS. 2 and 3 are what non-contacting probes (see FIG. 4) would indicate as shaft response when measured near the bearing centerlines. The vertical and horizontal probes may be located in line with gravity, and perpendicular to gravity, respectively; preferably, the normal probe pick-off locations are rotated 45° to the positions as indicated.

In the plot shown in FIG. 5, a fluid-film bearing conventionally mounted, to support the shaft of a blower in a blast furnace, will have a response as shown. In this, in the first mode, the bearing is excited at two speed ranges because of its asymmetry. As can be noted, the vertical mode excitation occurs within the crosshatched design or desired speed range.

According to our invention, an embodiment of which is shown in FIG. 6, a fluid-film bearing 10 is supported within a bearing housing assembly 12 on pivotal elements 14. Two of the elements 14 are provided, at the bottom and the top of the bearing 10, and each pivotal element 14 is engaged with a flexure pad 16 which is carried by the housing 18. The engagement of pivotal elements 14 with the flexure pads 16 provides for a pivotal movement of the bearing 10 within the housing 18, and reduces or eliminates vibration. Additionally, the two, opposite, lateral surfaces 20 of the bearing 10 are flat, and receive damping plates 22 which are carried by the inner surface 24 of the bearing housing 18. The damping plates 22 constrain the bearing 10 against horizontal movement within the housing and, in addition, provide for a damping of vertical movement of the bearing 10.

Adjustment screws 26, which extend through the side of the housing 18, engage the damping plates 22, in order that the horizontal constraint and vertical damping might be selectively, adjustably, increased or decreased. The flexure pads 16, in cross-section, define U-shaped channels 28.

The pivotal elements 14 are fit and staked into the bearing 10. The lower element 14 is held, in addition, by the fact that the 1-G load goes through to the flexure pad 16 and ultimately to ground. The upper element is lightly loaded by a small preload at assembly.

The horizontal constraint and damping plates 22 could be held positioned by shims, but the adjustment screws 26 give the ability to vary the "clearance" and, hence, the degree of constraint while running at speed. (Shims could not, of course, be adjusted at speed but only upon disassembly.) Two screws 26 are provided for each plate 22 to reduce warping and/or deformation of the plates which could, in turn, produce a more serious wear problem in the design. The flexure pads 16 are formed of a good quality steel. The same can be of special heat treat to improve the fatigue life thereof, if excessive vibration levels are to be encountered or designed for. A synthetic rubber pad 30 is nested in each of the pads 16, to add damping and stiffness to the assembly 12.

By means of this novel bearing and housing assembly 12, a slight angular displacement or slue of the bearing 10 is accommodated, and vertical movement or vibration is effectively damped. Thus, for a same application and design speed range as presented in FIG. 5, the first mode, asymmetrical excitation of the bearing 10 occurs at a single speed range outside of the design speed range — as plotted in FIG. 7.

In an alternative embodiment of the novel bearing and housing assembly 32, as shown in FIG. 8, an oil plate damper arrangement 34 is employed. In this practice, oil under pressure is supplied by line 36 to a close clearance 38 which obtains between the housing 18' and the pad 16. Then, the supplied oil and clearance 38 cooperate to provide squeeze film damping. Line 40 returns oil to supply. In lieu of oil, of course, visco-elastic damping could be provided; in this grease would be supplied to the U-shaped channels 28 of the flexure pads 16.

The pivotal elements 14 are elongate, as shown in FIG. 9, in order to transmit the load along a line contact, and have a flat 42 at the contact point to reduce local stress levels.

While we have described our invention in connection with specific embodiments thereof, it is to be clearly understood that this is done only by way of example, and not as a limitation to the scope of our invention as set forth in the objects thereof and in the appended claims.

We claim:
1. A bearing and housing assembly, comprising:
a fluid-film bearing;
a housing in envelopment of said bearing;
means mounting said bearing, within said housing, pivotally on an axis perpendicular to said bearing; wherein
said mounting means includes means accommodating relative movement between said bearing and said housing along said axis; and further including
means interposed between said bearing and said housing, on opposite sides of said bearing, for damping said relative movement; and wherein
said mounting means comprises flexure pads disposed transverse to said axis, on opposite sides of said bearing, and pivot elements interposed between said bearing and said pads in contacting engagement with only intermediate, axis-bisected portions of said pads.

2. A bearing and housing assembly, according to claim 1, wherein:
said damping means comprises rigid pressure plates.

3. A bearing and housing assembly, according to claim 2, wherein:
said bearing has flat bearing surfaces formed on external, opposite sides thereof; and
each of said flat bearing surfaces slidably engages one of said rigid pressure plates.

4. A bearing and housing assembly, according to claim 3, further including:
adjustment means, carried by said housing, for causing said pressure plates to engage said flat bearing surfaces with a selectively variable pressure.

5. A bearing and housing assembly, according to claim 3, wherein:
said pivot elements are partially nested in an outermost surface of said bearing and protrude therefrom, along said axis, to engage said pads.

6. A bearing and housing assembly, according to claim 1, wherein:
said damping means includes means for selectively adjusting movement damping thereby.

7. A bearing and housing assembly, according to claim 1, wherein:
said flexure pads and an inner surface of said housing together define voids therebetween; and further including
elastomeric material disposed in said voids, for damping vibration.

8. A bearing and housing assembly, according to claim 1, wherein:
said flexure pads and an inner surface of said housing together define voids therebetween; and further including
means for introducing oil under pressure into at least one of said voids.

* * * * *